United States Patent
Sasabuchi

(10) Patent No.: US 8,717,225 B2
(45) Date of Patent: May 6, 2014

(54) OBJECT DETECTION DEVICE FOR VEHICLE AND OBJECT DETECTION METHOD FOR VEHICLE

(75) Inventor: Yoji Sasabuchi, Takanezawa-machi (JP)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 13/387,961

(22) PCT Filed: May 26, 2010

(86) PCT No.: PCT/JP2010/003502
§ 371 (c)(1),
(2), (4) Date: Jan. 30, 2012

(87) PCT Pub. No.: WO2011/013284
PCT Pub. Date: Feb. 3, 2011

(65) Prior Publication Data
US 2012/0127017 A1 May 24, 2012

(30) Foreign Application Priority Data
Jul. 31, 2009 (JP) ................................. 2009-179288

(51) Int. Cl.
*G01S 13/93* (2006.01)
*G01S 7/41* (2006.01)
*G08G 1/16* (2006.01)

(52) U.S. Cl.
CPC ............... *G01S 13/931* (2013.01); *G01S 7/411* (2013.01); *G08G 1/16* (2013.01); *G08G 1/166* (2013.01)
USPC .............................. 342/70; 342/107; 342/114

(58) Field of Classification Search
CPC ......... G01S 13/931; G01S 7/411; G08G 1/16; G08G 1/165; G08G 1/166
USPC ............ 342/70–72, 104, 107, 109, 113–115; 701/301; 340/903, 435, 436
See application file for complete search history.

(56) References Cited

U.S. PATENT DOCUMENTS

| | | | | |
|---|---|---|---|---|
| 5,689,264 | A * | 11/1997 | Ishikawa et al. | 342/70 |
| 7,266,453 | B2 * | 9/2007 | Sawamoto et al. | 701/300 |
| 8,031,107 | B2 * | 10/2011 | Sasabuchi et al. | 342/70 |
| 2003/0218564 | A1 * | 11/2003 | Tamatsu et al. | 342/70 |

(Continued)

FOREIGN PATENT DOCUMENTS

| | | |
|---|---|---|
| DE | 101 41 055 A1 | 3/2003 |
| DE | 10 2006 057 277 A1 | 6/2008 |

(Continued)

OTHER PUBLICATIONS

International Search Report, PCT/JP2010/003502 mailing date Sep. 7, 2010.

*Primary Examiner* — John B Sotomayor
(74) *Attorney, Agent, or Firm* — Arent Fox LLP

(57) ABSTRACT

An object detection device for a vehicle includes a transmission and reception unit that transmits an electromagnetic wave and receives a reflected wave, a reflecting point computation unit that computes a position of a reflecting point of the electromagnetic wave on the object, a distance computation unit that computes a distance from the subject vehicle to the object, an end point detection unit that detects at least one of an end point on the right side of the object and an end point on the left side thereof, a shielding determination unit that determines whether the end point of the object is shielded by another object when viewed from the subject vehicle, and an end point movement speed computation unit that computes a lateral movement speed of the end point of the object determined as not being shielded.

16 Claims, 5 Drawing Sheets

(56) References Cited

U.S. PATENT DOCUMENTS

| | | |
|---|---|---|
| 2005/0034036 A1 | 2/2005 | Lages et al. |
| 2005/0110673 A1* | 5/2005 | Izumi et al. ................. 342/70 |
| 2010/0283663 A1* | 11/2010 | Sasabuchi et al. ............ 342/70 |
| 2011/0063157 A1 | 3/2011 | Jordan et al. |
| 2012/0127017 A1* | 5/2012 | Sasabuchi ................... 342/70 |
| 2013/0006476 A1* | 1/2013 | Yamazaki .................... 701/42 |

FOREIGN PATENT DOCUMENTS

| | | |
|---|---|---|
| EP | 1 267 178 A1 | 12/2002 |
| EP | 1 298 012 A2 | 4/2003 |
| JP | 10-105891 A | 4/1998 |
| JP | 2002-181936 A | 6/2002 |
| JP | 2005-100232 A | 4/2005 |
| JP | 2012247829 A * | 12/2012 |

* cited by examiner

OBJECT DETECTION DEVICE FOR VEHICLE AND OBJECT DETECTION METHOD FOR VEHICLE

CROSS-REFERENCE TO RELATED APPLICATIONS

This application is a National Stage entry of International Application No. PCT/JP2010/003502, filed May 26, 2010, which claims priority to Japanese Patent Application No. P2009-179288 filed Jul. 31, 2009, the disclosure of the prior application are incorporated in their entirety by reference.

TECHNICAL FIELD

The present invention relates to an object detection device for a vehicle, and an object detection method for a vehicle.

Priority is claimed on Japanese Patent Application No. 2009-179288, filed Jul. 31, 2009, the content of which is incorporated herein by reference.

BACKGROUND ART

In the related art, for example, a traveling control device that detects obstacles around a subject vehicle by a radar device, and controls the vehicle so as to avoid collision against obstacles has been disclosed (for example, Patent Document 1).

PRIOR ART DOCUMENTS

Patent Documents

[Patent Document 1] Japanese Unexamined Patent Application, First Publication No. 2005-100232

DISCLOSURE OF THE INVENTION

Problems to be Solved by the Invention

However, in the traveling control device according to the above related art, in a case in which another object is present in front of an obstacle that is a detection object when viewed from the subject vehicle, a part of the obstacle is shielded by the another object, so that the whole of the obstacle may not be detected. In this instance, when detecting a movement state of the obstacle based on the movement of an end point or the center of gravity of the obstacle that is detected by the radar device, there is a disadvantage of erroneously detecting a stationary obstacle as a moving obstacle. That is, even though the obstacle is stationary, in accordance with a change in a relative position between the another object that is present in front of the obstacle and the subject vehicle, the size and a shape of the detected obstacle are changed, so that an end point or the center of gravity of the obstacle detected by the radar device is changed.

The invention takes the above circumstances into consideration, and an object thereof is to provide an object detection device for a vehicle and an object detection method for a vehicle, which can accurately detect the halt and movement state of an object present outside the subject vehicle.

Means for Solving the Problems

In order to overcome the above described problem and achieve the related object, the present invention has adopted the following configuration.

(1) According to an aspect of the invention, there is provided an object detection device for a vehicle including: a transmission and reception unit that transmits an electromagnetic wave, and receives a reflected wave which is generated when the electromagnetic wave is reflected by an object around a subject vehicle; a reflecting point computation unit that computes a position of a reflecting point of the electromagnetic wave on the object based on a signal from the transmission and reception unit; a distance computation unit that computes a distance from the subject vehicle to the object based on the position of the reflecting point computed by the reflecting point computation unit; an end point detection unit that detects at least one of an end point on the right side of the object and an end point on the left side of the object based on the position of the reflecting point computed by the reflecting point computation unit; a shielding determination unit that determines whether the end point of the object is shielded by another object when viewed from the subject vehicle based on the computation result of the distance computation unit and the detection result of the end point detection unit; and an end point movement speed computation unit that computes a lateral movement speed of the end point of the object determined as not being shielded by the shielding determination unit.

(2) The shielding determination unit may determine whether the end point of the object detected by the end point detection unit when viewed from the subject vehicle is overlapped with the another object positioned at a distance closer than the distance of the object computed by the distance computation unit.

(3) The end point movement speed computation unit may compute the lateral movement speed of the end point as being zero when the end point on the right side of the object and the end point on the left side of the object are determined as being shielded by the shielding determination unit.

(4) The end point movement speed computation unit may compute the lateral movement speed of the end point as being zero when it is determined that one of the end point on the right side and the end point on the left side detected by the end point detection unit is present in a boundary end of a transmission range of the transmission and reception unit or outside the transmission range, and the other of the end point on the right side and the end point on the left side is determined as being shielded by the shielding determination unit.

(5) The object detection device may further include an object determination unit that determines the object to be a stationary object in which at least a part of the object is shielded with respect to the subject vehicle when the lateral movement speed of the end point computed by the end point movement speed computation unit is zero.

(6) The object detection device for the vehicle may further include a sensor unit that detects a state of the subject vehicle. Here, the object determination unit may determine presence and absence of a possibility of collision of the object against the subject vehicle based on the computation result of the end point movement speed computation unit and the detection result of the sensor unit.

(7) The object detection device for the vehicle may further include a vehicle control unit that controls the subject vehicle based on the determination result of the object determination unit.

(8) According to another aspect of the invention, there is provided an object detection method for a vehicle including: a reflected wave generation process in which an electromagnetic wave is transmitted, and a reflected wave is generated when the electromagnetic wave is reflected by an object around a subject vehicle; a reflecting point computation process in which a position of a reflecting point of the electromagnetic wave on the object is computed based on the received reflected wave; a distance computation process in which a distance from the subject vehicle to the object is computed based on the position of the reflecting point computed by the reflecting point computation process; an end point detection process in which at least one of an end point on the right side of the object and an end point on the left side of the object is detected based on the position of the reflecting point computed by the reflecting point computation process; a shielding determination process in which whether the end point of the object is shielded by another object when viewed from the subject vehicle is determined based on the computation result of the distance computation process and the detection result of the end point detection process; and an end point movement speed computation process in which a lateral movement speed of the end point of the object determined as not being shielded by the shielding determination process is computed.

(9) The shielding determination process may determine whether the end point of the object detected by the end point detection process is overlapped with the another object positioned at a distance closer than the distance of the object computed by the distance computation process.

(10) The object detection method for the vehicle may further includes an object determination process in which the object is determined as a stationary object in which at least a part of the object is shielded with respect to the subject vehicle when the lateral movement speed of the end point computed by the end point movement speed computation process is zero.

Effects of Invention

According to the object detection device for a vehicle of the present invention, it is possible to accurately detect the halt and a lateral movement state of a detection object, and the like even through a part of the detection object is shielded by a comparison object when viewed from a subject vehicle.

DETAILED DESCRIPTION OF EMBODIMENTS

Hereinafter, exemplary embodiments of the invention will now be described in detail with reference to the accompanying drawings.

Figure 1:
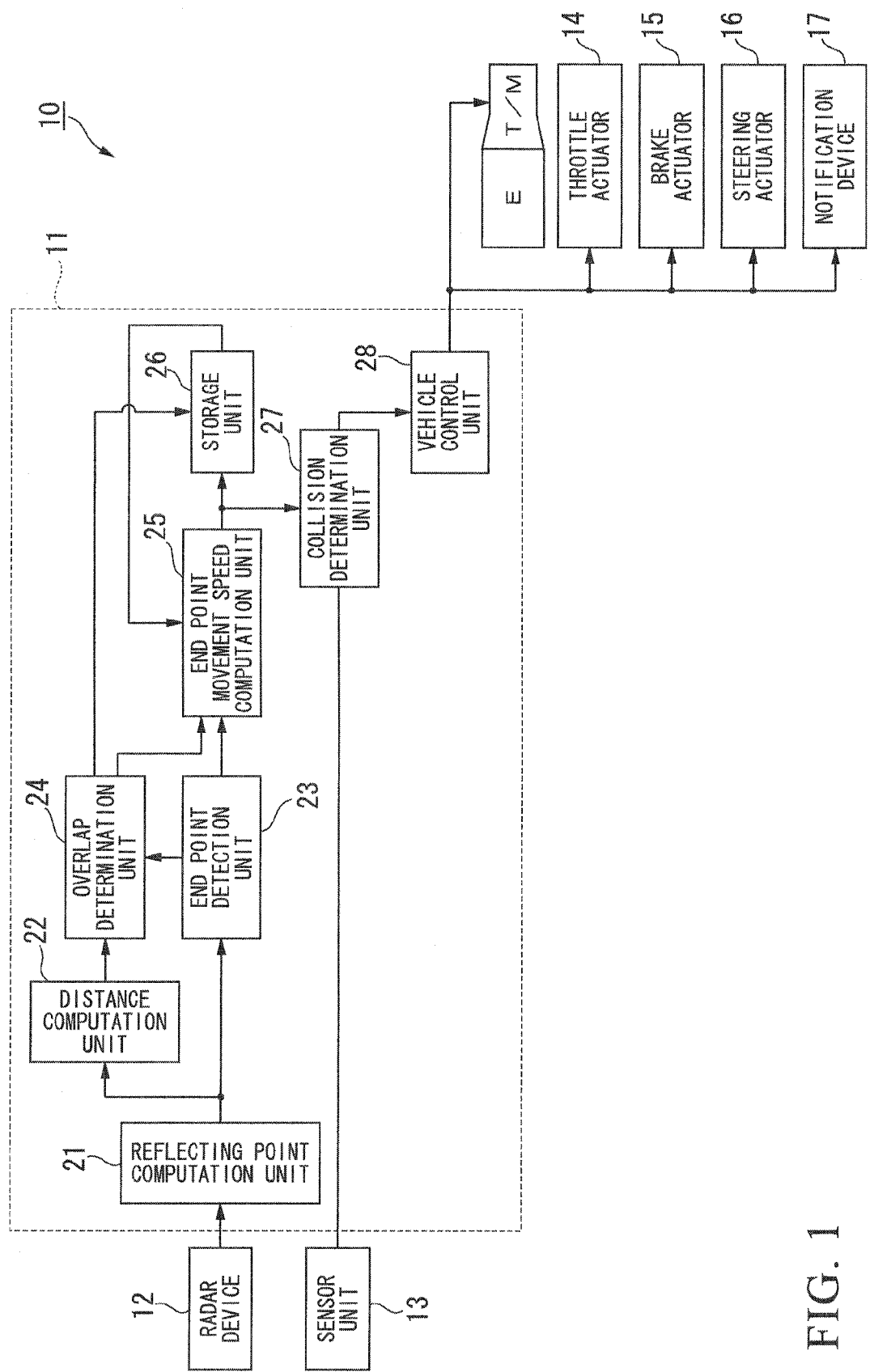
FIG. 1 is a block diagram showing a configuration of an object detection device for a vehicle according to an embodiment of the present invention.

For example, as shown in FIG. 1, an object detection device 10 for a vehicle according to an embodiment includes a processing unit 11 having a CPU (central processing device) that controls the object detection device 10 for a vehicle, a radar device 12 (a transmission and reception unit), a sensor unit 13 (a vehicle state sensor), a throttle actuator 14, a brake actuator 15, a steering actuator 16, and a notification device 17.

The radar device 12 divides a predetermined region (a radar detection region α) set outside the subject vehicle into a plurality of angular regions, and transmits transmitting signals of an electromagnetic wave so as to scan each of the angular regions. Each of the transmitting signals from the radar device 12 are reflected by an object (for example, other vehicles, structures, and the like) outside of the subject vehicle, so that a reflected signal is generated, and the radar device 12 receives the reflected signal. The radar device 12 generates a detection signal concerning a position of a reflecting point of the transmitting signal or a distance from the radar device 12 to the object outside of the subject vehicle, and outputs the detection signal to the processing unit 11.

The sensor unit 13 includes, for example, a vehicle speed sensor that detects the speed of the subject vehicle (a vehicle speed), an acceleration sensor that detects an acceleration exerted on a vehicle body, a gyro sensor that detects a traveling direction or a posture of the vehicle body, a yaw rate sensor that detects a yaw rate (a rotating angular velocity around the axis of the vertical direction of the center of gravity of the vehicle), a positioning signal receiver that receives positioning signals such as GPS (Global Positioning System) signals, and the like that measures a position of the subject vehicle using, for example, a satellite, various sensors that detects driving operations of a driver, and the like, so that it is possible to output signals of detection results concerning a variety of vehicle information of the subject vehicle. Here, as examples of the driving operations of the driver, a stepping operation amount of an acceleration pedal, a stepping operation amount of a brake pedal, a steering angle of a steering wheel, a shift position, and the like may be given.

The processing unit 11 of the object detection device 10 for the vehicle includes, for example, a reflecting point computation unit 21, a distance computation unit 22, an end point detection unit 23, an overlap determination unit 24, an end point movement speed computation unit 25, a storage unit 26, a collision determination unit 27, and a vehicle control unit 28.

The reflecting point computation unit 21 computes a position of the reflecting point of the electromagnetic wave that is transmitted from the radar device 12, and reflected on the object (a surface of the object) present outside the subject vehicle, based on the detection signal which is output from the radar device 12.

The distance computation unit 22 computes a distance from the subject vehicle to the object based on the position of the reflecting point that is computed by the reflecting point computation unit 21. It is preferable that the distance is computed based on positions of a plurality of reflecting points.

The end point detection unit 23 detects at least one of an end point on the right side of the object and an end point on the left side thereof based on the position of the reflecting point that is computed by the reflecting point computation unit 21. It is preferable that the end point on the right side or the end point on the left side is detected based on the positions of the plurality of reflecting points.

When a plurality of objects is present in the detection region of the radar device 12, and an object as a detection object and an object as a comparison object located at a position closer to the subject vehicle than the detection object are appropriately disposed, the overlap determination unit 24 (a shielding determination unit) determines whether an end point of the detection object is overlapped with the comparison object when viewed from the subject vehicle, based on the distance from the subject vehicle to the object computed by the distance computation unit 22 and at least one of the end point on the right side and the end point on the left side of the object that is detected by the end point detection unit 23, and outputs a signal of the determination result. That is, the overlap determination unit 24 (the shielding determination unit) determines whether the end point of the detection object is shielded by the comparison object that is another object when viewed from the subject vehicle, based on the computation result (the distance) of the distance computation unit 22 and the detection result (the end point) of the end point detection unit 23. The signal of the determination result is, for example, a signal of a flag value of an overlap flag indicating the end point of the detection object is overlapped with the comparison object when viewed from the subject vehicle. Here, that the end point of the detection object is overlapped with the comparison object when viewed from the subject vehicle illustrates that, for example, a line of sight from the subject vehicle to the detection object is shielded by the comparison object. In the following description, the end point of the detection object that is overlapped with the comparison object when viewed from the subject vehicle may be described as an overlapping end point (a shielding end point), and the end point of the detection object that is not overlapped with the comparison object when viewed from the subject vehicle may be described as a non-overlapping end point (a non-shielding end point).

Figure 2:
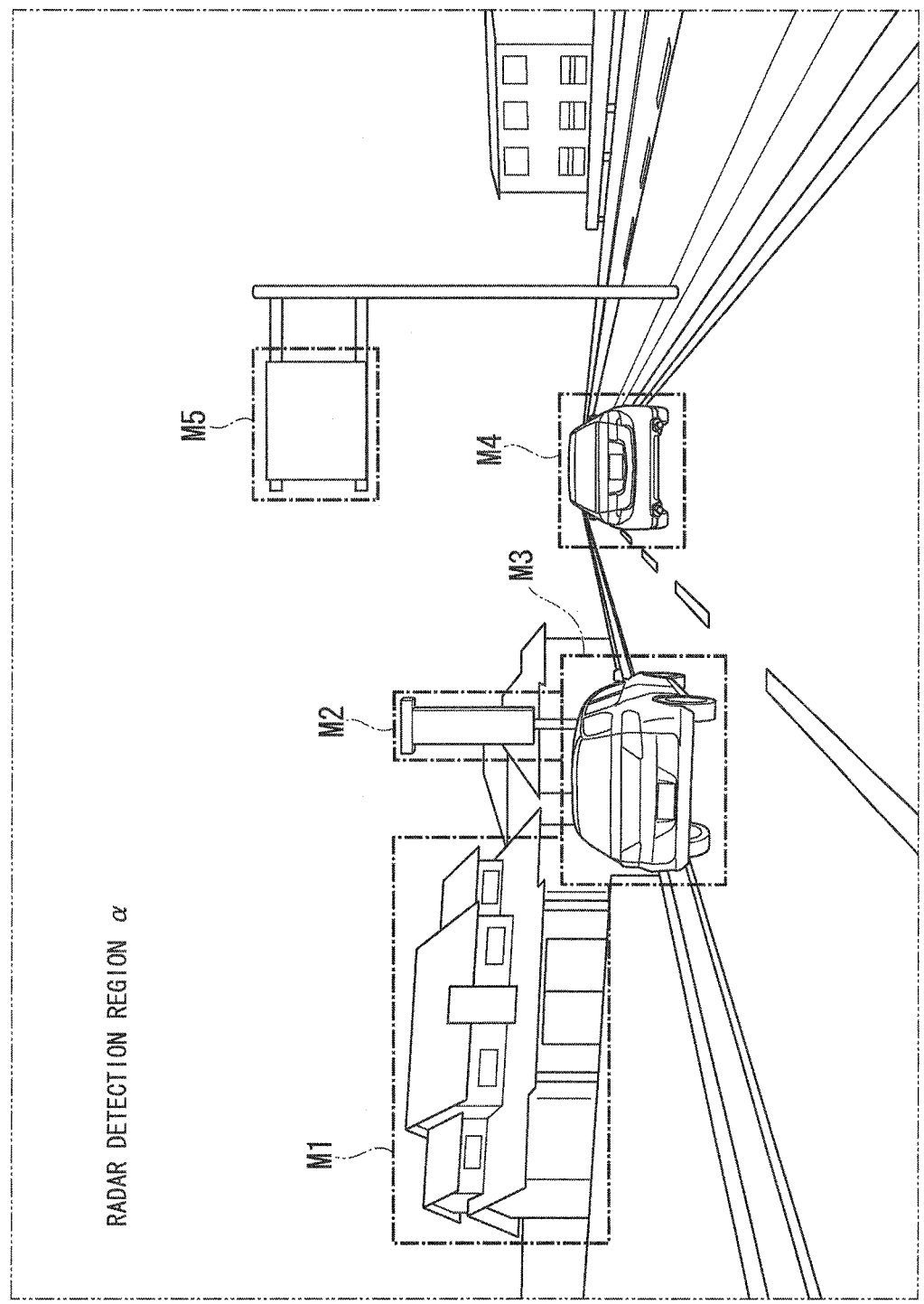
FIG. 2 is a diagram showing an example of each of objects M1, M2, M3, M4, and M5 having the total number m (for example, m=5) which are detected within a predetermined radar detection region α of a radar device shown in FIG. 1.

For example, as shown in FIG. 2, within a predetermined radar detection region a of the radar device 12, a plurality of objects (for example, objects M1 to M5) having the total number m of objects (for example, m=5) is detected. In each of the objects M1, M2, M3, M4, and M5, when the detection object is, for example, the object M1 and the object M2, an end point on the right lower side of the object M1 as the detection object is determined as being overlapped with the object M3 as the comparison object. In addition, end points on the left lower side and the right lower side of the object M2 as the detection object are determined as being overlapped with the object M3 as the comparison object. That is, the end point on the right lower side of the object M1 and the end points on the left lower side and the right lower side of the object M2 are determined as the overlapping end point (the shielding end point). For example, the end point on the left side of the object M1 that is not overlapped with the object M3 when viewed from the subject vehicle is the non-overlapping end point (the non-shielding end point).

The end point movement speed computation unit 25 computes a lateral movement speed Vy (a relative speed in the vehicle width direction (a Y direction of FIG. 3)) of the end point of the detection object that is determined as not being overlapped by the overlap determination unit 24. That is, the end point movement speed computation unit 25 computes the lateral movement speed Vy of the non-overlapping end point that is determined by the overlap determination unit 24.

Figure 3:
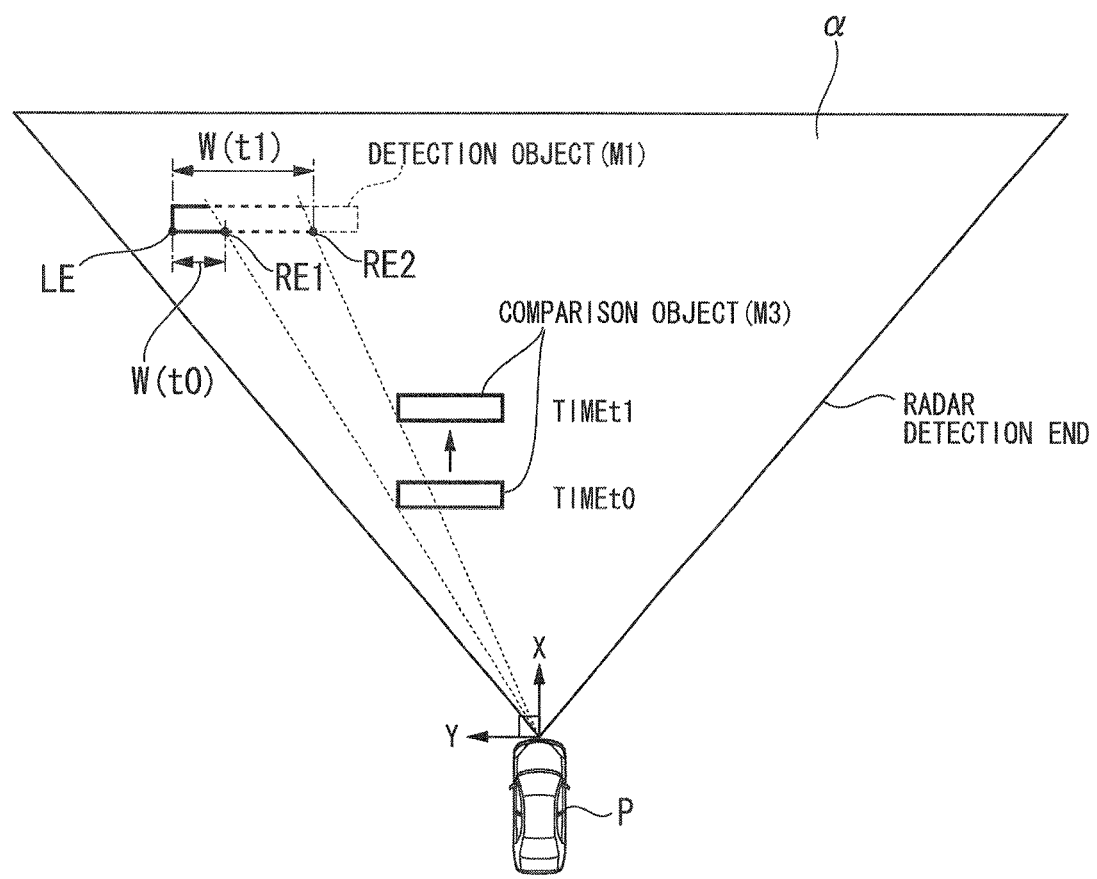
FIG. 3 is a diagram showing an example of a detection object and a comparison object within a predetermined radar detection region α of a radar device shown in FIG. 1.

For example, as shown in FIG. 3, when the comparison object (the object M3) that moves between the detection object (the object M1) being stationary and the subject vehicle P is present, and the end point (for example, an end point on the right lower side of the object M1) of the detection object is overlapped with the comparison object when viewed from the subject vehicle, a size of the detection object (the object M1) detected by the radar device 12 is changed (for example, a change in a lateral width of width W (t0) to width W (t1)) in accordance with the change of time (for example, a change of time t0 to t1). Due to this, an end point (for example, an end point on the right lower side of the object M1) of the detection object on a side that is overlapped with the comparison object is detected as moving. That is, with the change of time, the end point (for example, an end point on the right lower side) of the detection object that is detected by the end point detection unit 23 moves from an end point RE1 to an end point RE2 shown in FIG. 3. However, the lateral movement speed Vy (the relative speed in the vehicle width direction) of the end point (for example, an end point LE on the left side of the object M1) of the detection object that is not overlapped with the comparison object is computed, so that the lateral movement speed Vy of the end point of the detection object (the object M1) that is stationary is zero. That is, when the detection object is stationary, the lateral movement speed Vy of the non-overlapping end point is zero.

Further, when the end points on both the left and right sides of the detection object are determined as being overlapped with the comparison object when viewed from the subject vehicle by the overlap determination unit 24, the end point movement speed computation unit 25 computes the lateral movement speed Vy (the relative speed in the vehicle width direction) of the end point of the detection object as being zero. That is, when the end points on both the left and right sides of the detection object are determined as being the overlapping end point by the overlap determination unit 24, the lateral movement speed Vy of the end point of the detection object is computed as being zero.

In addition, when an end point on one side of the right side and the left side of the detection object is present on left and right boundary ends (a radar detection end) of a predetermined transmitting range of the electromagnetic wave transmitted from the radar device 12, or present outside the predetermined transmitting range, and an end point of the other side of the right side and the left side is determined being overlapped with the comparison object by the overlap determination unit 24 when viewed from the subject vehicle, the end point movement speed computation unit 25 computes the lateral movement speed. Vy (the relative speed in the vehicle width direction) of the end point of the detection object as being zero. That is, when the end point on one side of the detection object is positioned outside (including the boundary end) the radar detection region α, and the end point on the other side of the detection object is determined as the overlapping end point by the overlap determination unit 24, the lateral movement speed Vy of the end point of the detection object is computed as being zero.

The storage unit 26 stores the past data of the position of the end point (the non-overlapping end point) of the detection object that is determined as not being overlapped with the comparison object by the overlap determination unit 24. That is, the storage unit 26 stores the position of the non-overlapping end point of the detection object in accordance with the change of time.

In addition, the storage unit 26 stores a flag value of an overlap flag that is output from the overlap determination unit 24, and the lateral movement speed Vy of the end point of the detection object that is output from the end point movement speed computation unit 25.

The collision determination unit 27 determines presence and absence of a possibility of collision between the subject vehicle and the detection object based on signals of the detection result concerning a variety of vehicle information that is output from the sensor unit 13 and the lateral movement speed Vy that is computed by the end point movement speed computation unit 25.

When the lateral movement speed Vy (the relative speed in the vehicle width direction) of the end point of the detection object that is computed by the end point movement speed computation unit 25 is zero, the collision determination unit 27 determines the detection object as being a stationary object in a lateral direction (that is, in the vehicle width direction) in which at least a part is shielded by the comparison object with respect to the subject vehicle, and determines that the possibility of collision with respect to the subject vehicle is absent.

The vehicle control unit 28 outputs a control signal for controlling a traveling state of the subject vehicle in accordance with the determination result by the collision determination unit 27. As examples of the control signal, for example, a control signal for controlling a shifting operation of transmission (T/M), a control signal for controlling a driving force of an internal combustion engine (E) by a throttle actuator 14, a control signal for controlling deceleration by a brake actuator 15, a control signal for controlling a steering by a steering actuator 16, and the like.

In addition, when an occupant of the subject vehicle is notified of a variety of information, the vehicle control unit 28 may output a control signal for controlling the notification device 17.

An object detection method for a vehicle according to an embodiment of the present invention includes a reflected wave generation process, a reflecting point computation process, a distance computation process, an end point detection process, an overlap determination process (a shielding determination process), and an end point movement speed computation process.

In the reflected wave generation process, an electromagnetic wave is transmitted around the subject vehicle, and a reflected wave obtained such that the electromagnetic wave is reflected by an object around the subject vehicle is generated.

In the reflecting point computation process, a position of a reflecting point of the electromagnetic wave on the object is computed based on the received reflected wave (for example, a signal of the reflected wave).

In the distance computation process, a distance from the subject vehicle to the object is computed based on the position of the reflecting point that is computed by the reflecting point computation process.

In the end point detection process, an end point on at least one side of the right side and the left side of the object is detected based on the position of the reflecting point that is computed by the reflecting point computation process.

In the overlap determination process, whether an end point of an object that is a detection object is shielded by another object that is a comparison object when viewed from the subject vehicle is determined based on the computation result of the distance computation process and the detection result of the end point detection process.

In the end point movement speed computation process, a lateral movement speed of the end point of the object that is determined as not being shielded by the overlap determination process is computed.

In the overlap determination process, whether the end point of the object detected by the end point detection process is overlapped with another object that is the comparison object located at a distance closer than a distance of the object that is the detection object computed by the distance computation process is determined.

In the object detection method for the vehicle according to the present embodiment, an object determination process is further included. In the object determination process, when the lateral movement speed of the end point of the object that is computed by the end point movement speed computation process is zero, the object is determined as a stationary object in which at least a part of the object with respect to the subject vehicle is shielded.

Further, in the object detection method for the vehicle according to the present embodiment, a storage process for storing data of an end point that is not shielded may be further included. In the storage process, the past data of the position of the end point (the non-overlapping end point) of the detection object that is determined as not being overlapped with another object that is the comparison object by the overlap determination process is stored. That is, in the storage process, the position of the non-overlapping end point (the non-shielding end point) of the detection object in accordance with a change of time is stored.

In addition, in the storage process, the determination result determined in the overlap determination process, and the lateral movement speed Vy of the end point of the detection object computed in the end point movement speed computation process may be stored.

Further, in the object detection method for the vehicle according to the present embodiment, a collision determination process may be further included. In the collision determination process, presence and absence of a possibility of collision between the subject vehicle and the detection object may be determined based on, for example, the detection result concerning a variety of vehicle information of the subject vehicle output from the sensor unit 13, and the lateral movement speed Vy computed in the end point movement speed computation process.

In the collision determination process, when the lateral movement speed Vy of the end point of the detection object that is computed in the end point movement speed computation process is zero, the detection object may be determined as the stationary object in a lateral direction, in which at least a part is shielded by the comparison object with respect to the subject vehicle, and the possibility of collision with respect to the subject vehicle may be determined as being absent.

Further, in the object detection method for the vehicle according to the present embodiment, in response to the determination result by the collision determination process, a control process for controlling a traveling state of the subject vehicle may be further included. In addition, in the control process, the notification device for notifying an occupant of the subject vehicle of a variety of information may be controlled.

As for the object detection device for the vehicle and the object detection method for the vehicle according to the present embodiment, even when a part of the detection object is shielded by the comparison object when viewed from the subject vehicle, the lateral movement speed of the end point, from the end points on the left and right sides of the detection object, that is not overlapped with the comparison object when viewed from the subject vehicle is computed, so that the lateral movement speed of a moving detection object can be appropriately detected.

As for the object detection device for the vehicle and the object detection method for the vehicle according to the present embodiment, by enabling the lateral movement speed of the detection object of which left and right end points are overlapped with the comparison object to be zero, the collision determination process in which presence and absence of the possibility of collision with the subject vehicle is determined can be prevented from being vainly executed with respect to the detection object in which the possibility of collision with the subject vehicle is absent. Moreover, the collision determination with low accuracy or the false collision determination can be prevented from being executed with respect to the detection object having many uncertainties due to the end points on the left and right sides are overlapped with the comparison object.

As for the object detection device for the vehicle and the object detection method for the vehicle according to the present embodiment, by enabling the lateral movement speed to be zero when a part of the detection object is deviated from the predetermined transmission range of the electromagnetic wave, the collision determination process in which presence and absence of the possibility of collision with the subject vehicle is determined can be prevented from being vainly executed with respect to the detection object in which the possibility of collision with the subject vehicle is absent. Moreover, the collision determination with low accuracy or the false collision determination can be prevented from being executed with respect to the detection object having many uncertainties due to the end points on the left and right sides are overlapped with the comparison object.

As for the object detection device for the vehicle and the object detection method for the vehicle according to the present embodiment, even when a part of the detection object is shielded by the comparison object when viewed from the subject vehicle, the halt and a lateral movement state of the detection object can be appropriately detected.

As above, configurations of the object detection device for the vehicle and the object detection method for the vehicle according to the present embodiment have been described. Next, operations of the object detection device 10 for the vehicle will be described with reference to the appended drawings.

Figure 4:
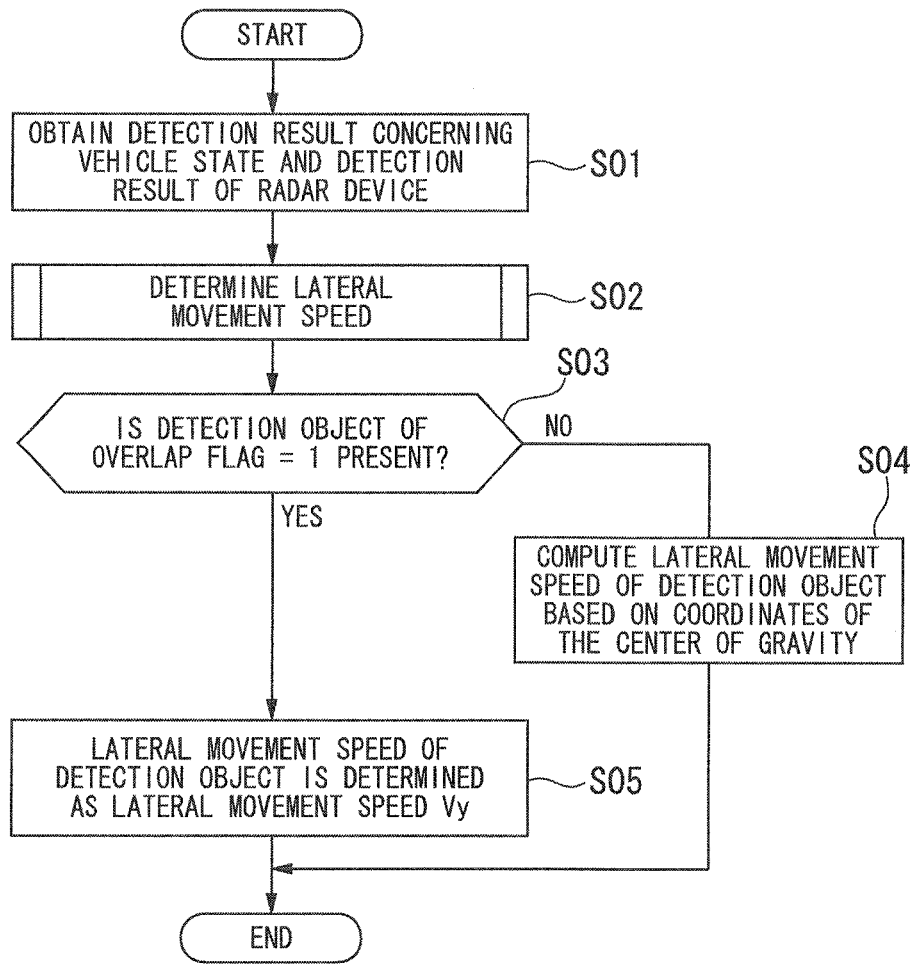
FIG. 4 is a flowchart showing operations of an object detection device for a vehicle shown in FIG. 1.

First, in step S01 shown in FIG. 4, a signal of the detection result concerning a variety of vehicle states (for example, a position, a vehicle speed, a yaw rate, and the like) of the subject vehicle that is output from the sensor unit 13 and a detection signal that is output from the radar device 12 are obtained. As examples of the detection result concerning the vehicle state of the subject vehicle, for example, a vehicle speed, a yaw rate, an operation amount of a driver, a detection value of a GPS measurement value concerning a position of the subject vehicle, and the like may be given. However, the detection result concerning a vehicle state of the subject vehicle is not limited only to the above described detection value, and includes raw data from each sensor, image data, and the like.

Next, in step S02, a determination process of a lateral movement speed of an end point of a detection object, which will be described later, is executed.

Next, in step S03, whether the detection object in which a flag value of an overlap flag is "1" is present from among the objects detected by the radar device 12 is determined.

When the determination result of step S03 is "NO", the corresponding process proceeds to step S04, a lateral movement speed of the detection object is computed based on a change in coordinates of the center of gravity of the detection object in step S04, and the corresponding process proceeds to "END".

Meanwhile, when the determination result of step S03 is "YES", the corresponding process proceeds to step S05.

In step S05, the lateral movement speed of the detection object is determined as the lateral movement speed Vy (described later) of the end point of the detection object that is computed in the determination process of step S02, and the corresponding process proceeds to "END". Further, when the lateral movement speed Vy of the end point of the detection object is zero, the detection object is determined as being a stationary object in a lateral direction.

Hereinafter, the determination process of the lateral movement speed of the end point of the detection object in the above described S02 will be described.

Figure 5:
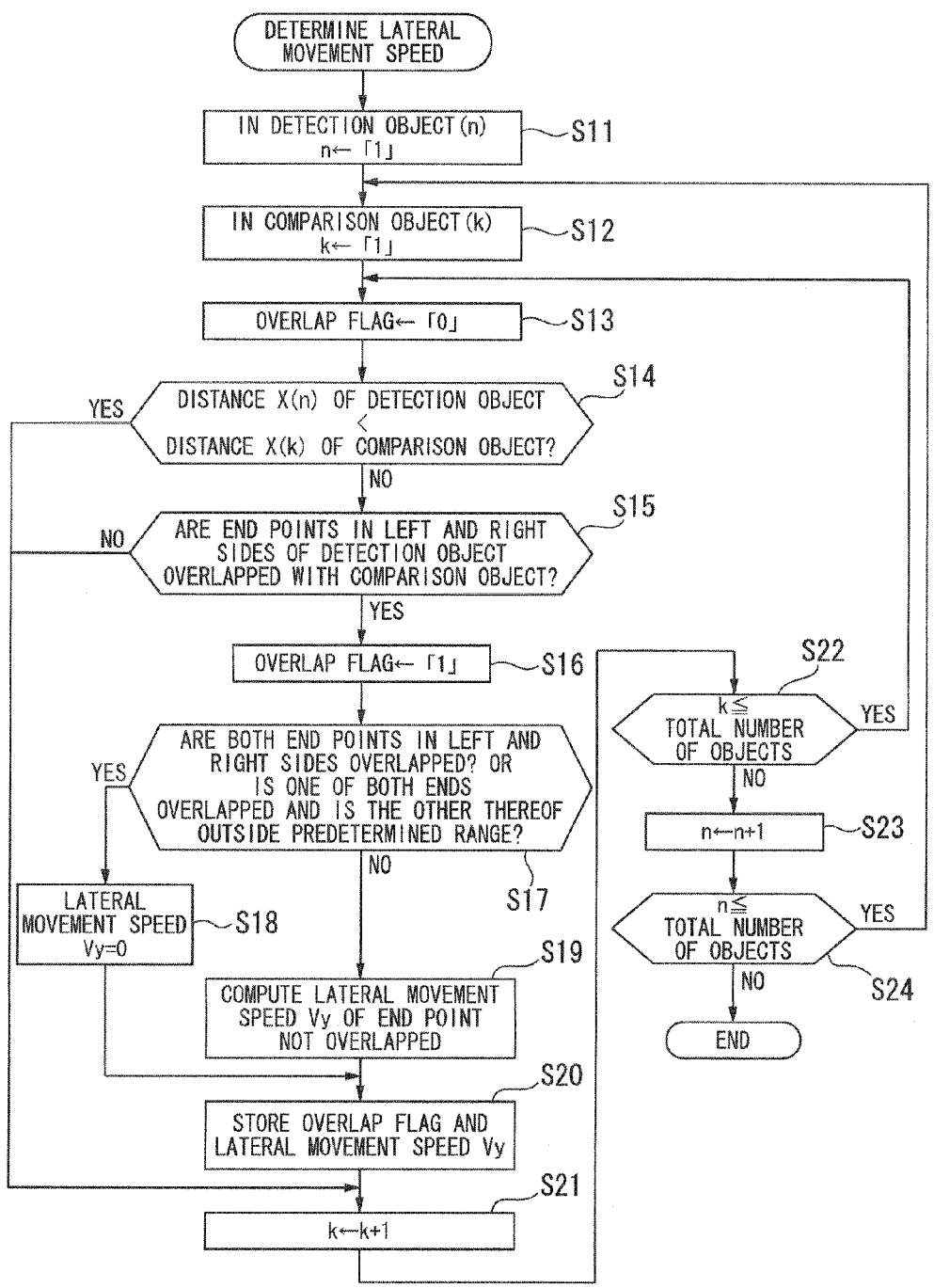
FIG. 5 is a flowchart showing operations of an object detection device for a vehicle shown in FIG. 1.

First, in step S11 shown in, for example, FIG. 5, "1" is set to a number n for identifying the detection object, and an initialization of the number n is executed.

In step S12, "1" is set to a number k for identifying the comparison object, and an initialization of the number k is executed.

In step S13, "0" is set to the flag value of the overlap flag.

In step S14, from among objects detected by the radar device 12, to which numbers starting from "1" are successively set, whether a distance X(n) (a distance from the subject vehicle) of the object having the number n for identifying the detection object is shorter than a distance X(k) (a distance from the subject vehicle) of the object having the number k for identifying the comparison object is determined.

When the determination result of step S14 is "YES", the corresponding process proceeds to step S21 which will be described later.

Meanwhile, when the determination result of step S14 is "NO", the corresponding process proceeds to step S15.

In step S15, whether at least one of end points on the left and right sides of the detection object (that is, the object having the number n for identifying the detection object) is overlapped with the comparison object (that is, the object having the number k for identifying the comparison object) when viewed from the subject vehicle is determined.

When the determination result of step S15 is "NO", the corresponding process proceeds to step S21 which will be described later.

Meanwhile, when the determination result of step S15 is "YES", the corresponding process proceeds to step S16.

In step S16, "1" is set to the flag value of the overlap flag.

In step S17, whether both end points on the left and right sides of the detection object are overlapped with the comparison object when viewed from the subject vehicle, or whether one of the end points on the left and right sides of the detection object is overlapped with the comparison object when viewed from the subject vehicle, and the other of the end points is present on left and right boundary ends (a radar detection end) of a predetermined transmission range of an electromagnetic wave transmitted from the radar device 12 or present outside the predetermined transmission range is determined.

When the determination result of step S17 is "YES", the corresponding process proceeds to step S18, the lateral movement speed Vy of the end point of the detection object is set to zero in step S18, and the corresponding process proceeds to step S20.

Meanwhile, when the determination result of step S17 is "NO", the corresponding process proceeds to step S19. In step S19, the lateral movement speed Vy of the end point on the left and right sides of the detection object that is not overlapped with the comparison object when viewed from the subject vehicle is computed, for example, based on the previous value and current value of the position of the end point, and the lateral movement speed Vy of the end point of the detection object is set as the lateral movement speed of the detection object.

In step S20, the flag value of the overlap flag that is set at this time, and the lateral movement speed Vy of the detection object are stored.

In step S21, a value (k+1) obtained by adding "1" to the number k for identifying the comparison object is newly set as the number k.

In step S22, whether the number k is the total number of the objects detected by the radar device 12 or less is determined.

When the determination result of step S22 is "YES", the corresponding process returns to the above described step S13.

Meanwhile, when the determination result of step S22 is "NO", the corresponding process proceeds to step S23.

Also, in step S23, a value (n+1) obtained by adding "1" to the number n for identifying the detection object is newly set as the number n.

In step S24, whether the number n is the total number of the objects detected by the radar device 12 or less is determined.

When the determination result of step S23 is "YES", the corresponding process returns to the above described step S12.

Meanwhile, when the determination result of step S23 is "NO", the corresponding process proceeds to "END".

As described above, according to the object detection device 10 for the vehicle of the present embodiment, even in a case in which a part of the detection object is shielded by the comparison object when viewed from the subject vehicle, it is possible to appropriately detect a stationary state of the detection object. Moreover, by computing the lateral movement speed Vy of the end point that is not overlapped with the comparison object when viewed from the subject vehicle from among the end points on the left and right sides of the detection object, it is possible to appropriately detect the lateral movement speed of a moving detection object.

Further, by enabling the lateral movement speed of the detection object of which the end points on the left and right sides are overlapped with the comparison object to be zero, the collision determination process in which presence and absence of the possibility of collision with the subject vehicle is determined can be prevented from being vainly executed with respect to the detection object in which the possibility of collision with the subject vehicle is absent. Moreover, the collision determination with low accuracy or false collision determination can be prevented from being executed with respect to the detection object having many uncertainties due to the end points on the left and right sides are overlapped with the comparison object.

Further, by enabling the lateral movement speed to be zero when a part of the detection object is deviated from the predetermined transmission range of the electromagnetic wave that is transmitted from the radar device 12, the collision determination process in which presence and absence of the possibility of collision with the subject vehicle is determined can be prevented from being vainly executed with respect to the detection object in which the possibility of collision with the subject vehicle is absent. Moreover, the collision determination with low accuracy or the false collision determination can be prevented from being executed with respect to the detection object having many uncertainties due to the end points on the left and right sides are overlapped with the comparison object.

INDUSTRIAL APPLICABILITY

In the object detection device for the vehicle and the object detection method for the vehicle according to the embodiments of the present invention, it is possible to appropriately detect the halt and a movement state of the object that is present outside a subject vehicle. Therefore, the object detection device for the vehicle and the object detection method for the vehicle according to the embodiments of the present invention can be widely applied to areas in which an external object is detected.

DESCRIPTION OF REFERENCE SYMBOLS

10: OBJECT DETECTION DEVICE FOR VEHICLE
11: PROCESSING UNIT
12: RADAR DEVICE (TRANSMISSION AND RECEPTION UNIT)
13: SENSOR UNIT
14: THROTTLE ACTUATOR
15: BRAKE ACTUATOR
16: STEERING ACTUATOR
17: NOTIFICATION DEVICE
21: REFLECTING POINT COMPUTATION UNIT (REFLECTING POINT COMPUTATION SECTION)
22: DISTANCE COMPUTATION UNIT (DISTANCE COMPUTATION SECTION)
23: END POINT DETECTION UNIT (END POINT DETECTION SECTION)
24: OVERLAP DETERMINATION UNIT (OVERLAP DETERMINATION SECTION)
25: END POINT MOVEMENT SPEED COMPUTATION UNIT (END POINT MOVEMENT SPEED COMPUTATION SECTION)
26: STORAGE UNIT (STORAGE SECTION)
27: COLLISION DETERMINATION UNIT (COLLISION DETERMINATION SECTION)
28: VEHICLE CONTROL UNIT (VEHICLE CONTROL SECTION)
P: SUBJECT VEHICLE
M1, M2, M3, M4, M5: OBJECT

The invention claimed is:

1. An object detection device for a vehicle, comprising:
a transmission and reception unit that transmits an electromagnetic wave, and receives a reflected wave which is generated when the electromagnetic wave is reflected by an object around a subject vehicle;
a reflecting point computation unit that computes a position of a reflecting point of the electromagnetic wave on the object based on a signal from the transmission and reception unit;
a distance computation unit that computes a distance from the subject vehicle to the object based on the position of the reflecting point computed by the reflecting point computation unit;
an end point detection unit that detects at least one of an end point on the right side of the object and an end point on the left side of the object based on the position of the reflecting point computed by the reflecting point computation unit;
a shielding determination unit that determines whether the end point of the object is shielded by another object when viewed from the subject vehicle based on the computation result of the distance computation unit and the detection result of the end point detection unit; and
an end point movement speed computation unit that computes a lateral movement speed of the end point of the object determined as not being shielded by the shielding determination unit.

2. The object detection device for the vehicle according to claim 1, wherein the shielding determination unit determines whether the end point of the object detected by the end point detection unit when viewed from the subject vehicle is overlapped with the another object positioned at a distance closer than the distance of the object computed by the distance computation unit.

3. The object detection device for the vehicle according to claim 2, wherein the end point movement speed computation unit computes the lateral movement speed of the end point as being zero when the end point on the right side of the object and the end point on the left side of the object are determined as being shielded by the shielding determination unit.

4. The object detection device for the vehicle according to claim 2, wherein the end point movement speed computation unit computes the lateral movement speed of the end point as being zero when it is determined that one of the end point on the right side and the end point on the left side detected by the end point detection unit is present in a boundary end of a transmission range of the transmission and reception unit or outside the transmission range, and the other of the end point on the right side and the end point on the left side is determined as being shielded by the shielding determination unit.

5. The object detection device for the vehicle according to claim 2, further comprising:
an object determination unit that determines the object to be a stationary object in which at least a part of the object is shielded with respect to the subject vehicle when the lateral movement speed of the end point computed by the end point movement speed computation unit is zero.

6. The object detection device for the vehicle according to claim 5, further comprising:
a sensor unit that detects a state of the subject vehicle,
wherein the object determination unit determines presence and absence of a possibility of collision of the object against the subject vehicle based on the computation result of the end point movement speed computation unit and the detection result of the sensor unit.

7. The object detection device for the vehicle according to claim 6, further comprising:
a vehicle control unit that controls the subject vehicle based on the determination result of the object determination unit.

8. An object detection method for a vehicle, comprising:
a reflected wave generation process in which an electromagnetic wave is transmitted, and a reflected wave is generated when the electromagnetic wave is reflected by an object around a subject vehicle;
a reflecting point computation process in which a position of a reflecting point of the electromagnetic wave on the object is computed based on the received reflected wave;
a distance computation process in which a distance from the subject vehicle to the object is computed based on the position of the reflecting point computed by the reflecting point computation process;
an end point detection process in which at least one of an end point on the right side of the object and an end point on the left side of the object is detected based on the position of the reflecting point computed by the reflecting point computation process;
a shielding determination process in which whether the end point of the object is shielded by another object when viewed from the subject vehicle is determined based on the computation result of the distance computation process and the detection result of the end point detection process; and
an end point movement speed computation process in which a lateral movement speed of the end point of the object determined as not being shielded by the shielding determination process is computed.

9. The object detection method for the vehicle according to claim 8, wherein the shielding determination process determines whether the end point of the object detected by the end point detection process is overlapped with the another object positioned at a distance closer than the distance of the object computed by the distance computation process.

10. The object detection method for the vehicle according to claim 9, further comprising:
an object determination process in which the object is determined as a stationary object in which at least a part of the object is shielded with respect to the subject vehicle when the lateral movement speed of the end point of the object computed by the end point movement speed computation process is zero.

11. The object detection device for the vehicle according to claim 3, further comprising:
an object determination unit that determines the object to be a stationary object in which at least a part of the object is shielded with respect to the subject vehicle when the lateral movement speed of the end point computed by the end point movement speed computation unit is zero.

12. The object detection device for the vehicle according to claim 4, further comprising:
an object determination unit that determines the object to be a stationary object in which at least a part of the object is shielded with respect to the subject vehicle when the lateral movement speed of the end point computed by the end point movement speed computation unit is zero.

13. The object detection device for the vehicle according to claim 11, further comprising:
a sensor unit that detects a state of the subject vehicle,
wherein the object determination unit determines presence and absence of a possibility of collision of the object against the subject vehicle based on the computation result of the end point movement speed computation unit and the detection result of the sensor unit.

14. The object detection device for the vehicle according to claim 12, further comprising:
a sensor unit that detects a state of the subject vehicle,
wherein the object determination unit determines presence and absence of a possibility of collision of the object against the subject vehicle based on the computation result of the end point movement speed computation unit and the detection result of the sensor unit.

15. The object detection device for the vehicle according to claim 13, further comprising:
a vehicle control unit that controls the subject vehicle based on the determination result of the object determination unit.

16. The object detection device for the vehicle according to claim 14, further comprising:
a vehicle control unit that controls the subject vehicle based on the determination result of the object determination unit.

* * * * *